United States Patent [19]

McClure et al.

[11] 3,719,699

[45] March 6, 1973

[54] PROCESS FOR THE PRODUCTION OF POLYISOCYANATES

[75] Inventors: James D. McClure; George W. Conklin, both of Oakland, Calif.

[73] Assignee: Shell Oil Company, New York, N.Y.

[22] Filed: Dec. 31, 1970

[21] Appl. No.: 103,347

[52] U.S. Cl..............................260/453 PC, 252/429
[51] Int. Cl..............................C07c 119/04
[58] Field of Search..............................260/453 PC

[56] References Cited

UNITED STATES PATENTS 3,632,827   1/1972   Smith..............................260/453 PC
3,523,964   8/1970   Kober et al.....................260/453 PC

*Primary Examiner*—Joseph P. Brust
*Attorney*—Howard W. Haworth and H. C. Geller

[57] ABSTRACT

An improved process for preparing carbocyclic aromatic isocyanates comprises contacting a carbocyclic aromatic polynitro compound with carbon monoxide in the presence of a catalyst system consisting of certain noble metal halides, heteroaromatic nitrogen compounds and a metal molybdate wherein the metal is iron or manganese.

14 Claims, No Drawings

PROCESS FOR THE PRODUCTION OF POLYISOCYANATES

BACKGROUND OF THE INVENTION

It is known that aromatic isocyanates can be prepared from aromatic nitro compounds by a two-step process which comprises (1) reducing the nitro compound to the corresponding amine and (2) contacting the amine with phosgene. See, for example W. Siefram, Liebigs Annalen der Chemie, volume 563 (1949) at page 96 and Germassmer, U.S. Pat. No. 3,188,337. It would be of advantage, however, to prepare aromatic polyisocyanates in a one-step process directly from aromatic polynitro compounds without prior or separate reduction to the corresponding polyamine. It would also be of advantage to prepare such aromatic polyisocyanates in a process which does not require the highly corrosive and toxic phosgene.

In order to provide such a simplified technique, it has been proposed to react an organic nitro compound with carbon monoxide in the presence of various metal catalysts. For example, British Patent No. 1,025,436 describes a process for preparing isocyanates from the corresponding nitro compounds by reacting the organic nitro compound with carbon monoxide in the presence of a noble metal or compound thereof. However, this process results in the production of no more than trace amounts of organic polyisocyanate when an aromatic polynitro compound such as dinitrotoluene is reacted with carbon monoxide using as a catalyst a noble metal compound such as rhodium trichloride, palladium dichloride, iridium trichloride or osmium trichloride.

Other related techniques utilize noble metal-based catalyst systems wherein additional components are added as promoters. For example, U.S. Pat. No. 3,461,149 describes the use of a catalyst system consisting of a noble metal or noble metal compound and a Lewis acid in the reaction of an organic nitro compound with carbon monoxide. However, the yield of aromatic diisocyanates from the corresponding aromatic dinitro compounds afforded by this process is still economically unattractive.

Other catalyst systems reported disclose the use of noble metal compounds with non-noble metal compounds (U.S. Pat. No. 3,523,966), with organophosphorus compounds (U.S. Pat. No. 3,523,962) and with acid halides used as promoters (U.S. Pat. 3,523,965). These catalyst systems exhibit little or no selectivity for the production of diisocyanates from the corresponding dinitro compounds.

Other noble metal-based catalyst systems have been disclosed which additionally contain a heteroaromatic nitrogen compound (published German application No. 1,815,517), a Group VB or VIB metal oxide together with an inorganic copper compound (U.S. Pat. No. 3,523,963) or discrete particles of iron oxide (published Netherlands application No. 6913250). However, utilization of these catalyst systems to produce isocyanates from a polynitro compound such as dinitrotoluene results in only moderate selectivity to a diisocyanate product when high total selectivity to isocyanate products is obtained. Moreover, such catalyst systems exhibit a marked decrease in selectivity to total isocyanate products at higher conversion levels.

It would be an advantage to utilize a catalyst which would afford a high selectivity to the polyisocyanate product at high levels of conversion of reactants in a one-step process wherein the polyisocyanate is produced directly from the corresponding polynitro compound. The term "polyisocyanate" as used herein refers to an organic compound with a plurality of isocyanate groups and does not refer to a polymeric material involving the isocyanate group.

SUMMARY OF THE INVENTION

It has now been found that carbocyclic aromatic polyisocyanates can be prepared in an improved process by contacting a carbocyclic aromatic polynitro compound with carbon monoxide at elevated temperature and pressure in the presence of a catalyst system consisting of certain noble metal halides wherein the noble metal is palladium or rhodium, a heteroaromatic nitrogen base and a metal molybdate wherein the metal is iron or manganese.

Noble metal halides such as palladium dichloride and rhodium trichloride, while individually inactive as catalysts for the conversion of aromatic nitro compounds to isocyanates, have been complexed with hetero-aromatic nitrogen bases such as pyridine and isoquinoline to produce an improved catalyst system. However, the activity of such catalyst systems is moderate and the selectivity for polyisocyanate products is low. The addition of an iron or manganese molybdate to such a catalyst system frequently results in quantitative conversions of the polynitro compound and a very high selectivity to the polyisocyanate product.

DESCRIPTION OF THE PREFERRED EMBODIMENTS

The improved process of the invention is conducted by contacting an aromatic carbocyclic polynitro compound with carbon monoxide at elevated temperature and pressure in the presence of a catalyst system as herein described to convert at least one but preferably all of the nitro groups to isocyanate groups. It appears likely that the reaction proceeds according to the following equation wherein dinitrotoluene has been selected as exemplary of polynitro compounds which may be used in practicing the process of this invention.

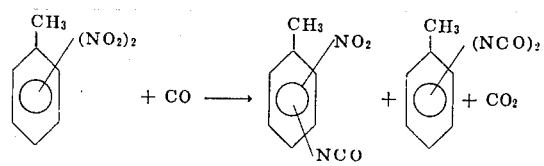

From the above equation it can be seen that more than one mole of carbon monoxide is required for the conversion of each mole of nitro group to the desired isocyanate product, and in practice the reaction is conducted in the presence of carbon monoxide equivalent to or in excess of that required for the reaction. In general, molar ratios of carbon monoxide to aromatic nitro reactant vary from about 3:1 to about 100:1.

Aromatic Nitro Compound. The process of the invention is generally applicable to aromatic polynitro compounds in which each nitro group is attached to an aromatic carbon atom, i.e., a carbon atom which is a member of a six-membered carbocyclic aromatic ring. The aromatic polynitro compound is monocyclic or polycyclic of up to four fused or separate aromatic rings, preferably of from one to two aromatic rings, has from six to 30 carbon atoms, preferably from six to 15 carbon atoms, and has from two to four nitro groups, preferably from two to three nitro groups, which comprise the only nitro groups present within the molecule. The aromatic polynitro compounds are carbocyclic aromatic polynitro compounds containing only carbon and hydrogen other than the nitrogen and oxygen atoms of the nitro groups or are substituted carbocyclic aromatic polynitro compounds additionally containing non-interfering substituents such as halogens of atomic number 9 to 53 inclusive, i.e., fluorine, chlorine, bromine, and iodine or atoms of oxygen and sulfur incorporated in non-interfering functional groups such as alkoxy, aryloxy, alkaryloxy, carbalkoxy, alkylthio and arylthio.

One class of such suitable aromatic compounds is represented by the formula (I)

wherein $m$ is a whole number from 0 to 3 inclusive and represents the number of R groups attached to the aromatic ring and R independently is nitro; hydrocarbyl of up to 10 carbon atoms; halogen of atomic number from 9 to 53 inclusive, preferably of atomic number from 17 to 35 inclusive, e.g., chlorine and bromine; alkoxy of up to six carbon atoms, e.g., methoxy, ethoxy and the like; aryloxy or alkaryloxy of up to 10 carbon atoms, such as benzyloxy, tolyloxy and the like; alkylthio of up to six carbon atoms such as methylthio and ethylthio; or arylthio of up to 10 carbon atoms such as phenylthio and p-methylphenylthio. Hydrocarbyl R groups are preferably free from aliphatic unsaturation and include alkyl such as methyl, ethyl propyl, pentyl and hexyl; cycloalkyl such as cyclopentyl and cyclohexyl; arylalkyl such as benzyl and phenylethyl; and aryl and alkaryl such as phenyl; tolyl and xylyl. The R groups of formula (I) may all be the same or may be in part or wholly different.

Exemplary aromatic polynitro compounds of formula (I) are 1,2-dinitrobenzene, 1,3-dinitrobenzene, 1,4-dinitrobenzene, 1,2,4-trinitro-benzene, 1,3,5-trinitrobenzene, 2,4-dinitrotoluene, 2,6-dinitrotoluene, 1-ethyl-3,5-dinitrobenzene, 1-propyl-2,4-dinitrobenzne, 1,2-dimethyl-3,5-dinitrobenzene, 1-cycloheptyl-2, 4-dinitrobenzene, 1-phenyl-3,5-dinitrobenzene, 1-(1-phenylethyl)-2,4-dinitrobenzene, 1-bromo-3-phenyl-2,4-dinitrobenzene, 1-methoxy-2,4-dinitro benzene, 1-phenoxy-2,4-dinitrobenzene, 1-benzyloxy-3,5-dinitrobenzene, 1-methoxy-3-methyl-2,4-dinitro-5-chlorobenzene, 1-phenylthio-2,4-dinitrobenzene, 1-chloro-2-methoxy-4-methylthio-3,5-dinitrobenzene and 1-phenoxy-3-chloro-2,4-dinitrobenzene and 1-ethylthio-2,4-dinitrobenzene.

Other suitable aromatic polynitro compounds include polycyclic aromatic polynitro compounds such as bicyclic naphthyl polynitro compounds, e.g., 1,3-dinitronaphthalene, 1-chloro-2,4-dinitronaphthalene, 1,5-dinitro-naphthalene, 1,8-dinitronaphthalene, 1,3,5-trinitronaphthalene and 1,3,6,8-tetranitronaphthalene and tricyclic polynitro compounds, e.g., dinitroanthracene and 2,7-dinitrophenanthrene.

Aromatic polynitro compounds of formula (I) having two to three nitro groups and having R groups selected from nitro, halogen and alkyl are preferably employed in the process of the invention.

The Catalyst. The chemical transformations during the course of the reaction which involve the catalyst are quite complex and no one single structure adequately describes the actual catalyst species. Although it is not desired to be bound by any particular theory, it appears that the actual catalyst species is the noble metal halide complexed or admixed with a hetero-aromatic nitrogen compound and promoted by a metal molybdate as co-catalyst.

Noble metal halides which can be utilized in the process of the invention include palladium dichloride, palladium dibromide, palladium diiodide, rhodium trichloride, rhodium tribromide and rhodium triiodide. Heteroaromatic nitrogen compounds which can be complexed or admixed with the noble metal halide and are useful within the process of this invention are those containing only nitrogen and carbon in a five or six member ring. The heteroaromatic nitrogen compounds are further characterized as containing one or two nitrogen atoms in a ring having at least two double bonds. Such compounds include pyrrole, imidazole, pyrazole, indole, pyridine, pyrazine, and pyridazine. Also effective are polycyclic analogues of the above compounds such as quinoline, isoquinoline, acridine phenanthridine, purine and pyrimidine and substituted derivatives of these compounds and their polycyclic analogues such as 1-methylpyrrole, 3-chloropyridine, 2-aminopyridine, 2,4,6-trimethylpyridine and 8-hydroxyquinoline. Particularly effective are pyridine and isoquinoline and substituted derivatives of pyridine and isoquinoline.

The metal molybdates which are the object of this invention are those of iron and manganese. The term "molybdate" as used herein includes the normal or mono molybdates as well as polymolybdates. Normal metal molybdates which are effective as co-catalysts include ferrous ($Fe^{II}$) molybdate, $FeMoO_4$; manganous ($Mn^{II}$) molybdate, $MnMoO_4$; ferric ($Fe^{III}$) molybdate, $Fe_2MoO_4]_3$; and manganic ($Mn^{IV}$) molybdate, $Mn(MoO_4)_2$.

Iron and manganese polymolybdates are compounds wherein iron and manganese are found in a complex molybdenum oxide matrix in varying ratios of molybdenum to iron or manganese. These polymolybdates can be prepared by precipitation from a solution of a soluble molybdate or polymolybdate salt by the addition of a solution of the iron or manganese compound of the desired oxidation state. The pH of the solution should be carefully controlled. In preparing the manganese polymolybdates, the pH at which the precipitation is effected will determine the ratio of molybdenum to manganese in the precipitate which forms. For example, when manganese ($Mn^{II}$) polymolybdate is precipitated upon the mixing of solutions of manganous nitrate, $Mn(NO_3)_2$, and ammonium heptamolybdate, at a pH of 2.3, the resulting manganese polymolybdate has a molybdenum/manganese ratio of approximately 20:1. If the precipitation is effected at a pH of 1.5, the precipitate will have a molybdenum/manganese ratio of approximately 80:1. In preparing the iron polymolybdates, various ratios of iron to molybdenum in the polymolybdate can be obtained by varying the ratio of these metals in the solutions which are admixed. Most of the iron polymolybdates can be precipitated at a pH of from about 1.7 to about 2.5. Ferric molybdate, $Fe_2(MoO_4)_3$, is precipitated at a pH of from about 7.0 to about 10.0.

Some of the simpler polymolybdates which can be made by the procedures described herein or by methods known in the art and which are effective as co-catalysts within the process of this invention include the dimolybdate $(Mo_2O_7)^{2-}$, tetramolybdate $(Mo_4O_{15})^{6-}$, heptamolybdate $(Mo_7O_{24})^{6-}$ and octamolybdate $(Mo_8O_{26})^{4-}$. Polymers of the heptamolybdates may also be utilized as co-catalysts.

While all of the iron and manganese molybdates herein described are effective as co-catalysts for the conversion of an aromatic polynitro compound to the corresponding polyisocyanate, there are certain iron and manganese molybdates that have been found to yield a higher selectivity for the polyisocyanate product and are to be preferred. These preferred molybdates are those wherein the ratio of molybdenum to iron or manganese lies within a certain range. Iron molybdates with a molybdenum/iron ratio in the range of from 1:1 to about 5:1 are preferred, and particularly the molybdate (molybdenum/iron ratio = 3:2) and the heptamolybdate (molybdenum/iron ratio = 7:2). Iron molybdates wherein the iron is in either the second or third oxidation state are effective as co-catalysts. Manganese molybdates wherein the molybdenum/manganese ratio is in the range of from about 1:1 to about 80:1 are effective as co-catalysts, with ratios in the range of from about 3:1 to about 45:1 being preferred. Manganese molybdates wherein the manganese is in either the second or fourth oxidation state are effective as co-catalysts.

The amount of catalyst system used in the process of the invention is not critical. The ratio of moles of nitro group to mole of noble metal halide can be selected to obtain the desired conversion level or selectivities at a given residence time in the reaction zone. Molar ratios of nitro groups/noble metal halide of up to 132:1 have proven satisfactory in batch operations with a reaction period of four hours; however, ratios between 33:1 and 66:1 are preferred.

The quantity of heteroaromatic nitrogen compound required is that amount which theoretically will complex with the noble metal halide. For example, each mole of palladium dichloride will theoretically complex with two moles of the heteroaromatic nitrogen compound, whereas each mole of rhodium trichloride will theoretically complex with three moles of the heteroaromatic nitrogen compound. However, in practice, amounts ranging from about one-half to about two times the amount theoretically required have been used with satisfactory results.

The amount of metal molybdate to be incorporated into the catalyst system is not critical. However, at a molybdenum to noble metal ratio below about 1:10 the catalytic activity becomes somewhat impaired. In general, the catalysts perform satisfactorily when the molybdenum to noble metal ratio is from about 1:4 to about 4:1.

The Reaction Conditions — The process of the invention is conducted by any of a variety of procedures. In one modification, the aromatic nitro compound, catalyst and carbon monoxide are charged to an autoclave or similar pressure reactor for operations in a batchwise manner. In another modification, reaction is effected in a continuous operation as by contacting the entire reaction mixture during passage through a tubular reactor. It is equivalently useful to add the carbon monoxide continuously throughout the period of the reaction.

The carbon monoxide is of normal commercial quality and may also contain carbon dioxide and other diluents which are inert in the reaction environment. These diluents should not be of such quantities as to require excessively large process equipment. Carbon monoxide additionally containing carbon dioxide in a $CO/CO_2$ molar ratio of 6:1 has given satisfactory results.

In any modification, the reaction is conducted at elevated temperature and pressure. Suitable reaction temperatures vary from about 100° C to about 300° C, with best results being obtained at temperatures from about 150° C to about 250° C. Of course, the reaction temperature selected will be below the decomposition temperature of any of the reactants and the desired product.

The reaction pressure will vary from about 500 psig to about 5,000 psig. When the process of the invention is conducted in a batchwise manner, the initial carbon monoxide pressure described will decrease with time as some of the carbon monoxide is consumed in the reaction. The total reactor pressure will be maintained so that a substantial portion of the reaction components are in the liquid phase.

The process of the invention operates effectively in the absence of a solvent, but improved overall yields of the organic polyisocyanate are obtained when a solvent which is chemically inert in the reaction environment is employed. Suitable solvents include liquid aromatic hydrocarbons such as benzene, toluene and xylene and aryl halides such as mono- and dichlorobenzene. The proportion of solvent used is not critical and any proportion may be utilized which will not require excessively large equipment to contain. Generally, the amount of polynitro compound in the solvent is in the range of from about 10 to about 50 weight percent.

It is important that the solvent, as well as the other materials charged into the reactor, be substantially anhydrous, since in the presence of water, isocyanates are converted to urea derivatives.

Subsequent to reaction, the reaction mixture is separated by conventional means such as distillation, selective extraction and the like. The polyisocyanate product can be further purified, as for example, by distillation. Those compounds separated from the reaction product wherein less than all of the nitro groups are converted to isocyanato groups, can be recycled along with the recovered solvent and further reacted by the process of this invention to convert the remaining nitro groups to isocyanato groups.

Organic polyisocyanates produced by the process of this invention are suitable for use in preparing polyurethane compositions such as foams, coatings, fibers and the like by reacting the polyisocyanate with a suitable polyether polyol in the presence of a catalyst and, if desired, a foaming agent.

The following examples are presented to describe the invention more fully without any intention of being limited thereby. All parts and percentages are by weight unless otherwise specified.

EXAMPLE I

PREPARATION OF THE POLYMOLYBDATE CO-CATALYSTS

Ferric heptamolybdate. To a solution of 11.4 grams of ferric chloride, $FeCl_3$, in 600 ml water at a pH of 1.7 was added a solution of 25.5 grams of ammonium heptamolybdate, $(NH_4)_6 Mo_7O_{24} \cdot 4H_2O$, in 400 ml water (pH adjusted to 2.25 with hydrochloric acid). The heptamolybdate solution was added slowly over a one hour period with constant stirring. The resulting green-yellow precipitate was collected and washed four times with 50 ml portions of water. The precipitate was air dried on a vacuum filter for three days and the resulting green-yellow glass was then powdered and dried under vacuum at 90° C. It weighed 23.5 grams. The precipitate was calcined at 300° C for 2 hours and analyzed for iron and molybdenum content with the following results:

| Metal | Ferric heptamolybdate $Fe_2Mo_7O_{24}$ | Catalyst Prepared |
|---|---|---|
| Fe, wt% | 9.65 | 10.0 |
| Mo, wt% | 57.6 | 57.0 |

Other iron polymolybdates are prepared by varying the ratio of the iron and molybdate solutions to yield the desired molybdenum/iron ratio.

Manganese polymolybdate. To a hot solution containing 31.5 grams of ammonium heptamolybdate in 200 ml water (adjusted to a pH of 2.25 with nitric acid), was added a solution of 5 grams of manganous nitrate, $Mn(NO_3)_2$, in 10 ml water. The nitrate solution was added slowly and the pH of the resulting mixture was 2.3. The off-white solid which separated on cooling was collected and washed three times with ice water. After drying at 115° C for 16 hours, the solid weighed 13.0 grams. It was then calcined at 300° C for 2 hours and analyzed for molybdenum and manganese. The ratio of molybdenum to manganese in the polymolybdate was found to be approximately 20:1.

Other manganese polymolybdates were prepared by the procedure herein described wherein the molybdenum/manganese ratio was varied by adjusting the pH at which the precipitation was effected. Some of the polymolybdates prepared and data concerning their preparation are listed in Table I.

TABLE I

| Co-catalyst | Mn Source | pH at Precipitation | Mo/Mn Ratio |
|---|---|---|---|
| Manganese polymolybdate | $Mn^{II}$ | 2.3 | 20:1 |
| Do | $Mn^{II}$ | 3.0–3.5 | 45:1 |
| Do | $Mn^{II}$ | 1.5 | 80:1 |

EXAMPLE II

Into an 80 ml INCONEL autoclave were charged 6 grams, 33 mmole (millimole), of 2,4-dinitrotoluene, 20 g. of dichlorobenzene, 2 mmoles of palladium dichloride and 0.3 g. of the ferric heptamolybdate, $Fe_2Mo_7O_{24}$, prepared according to the procedure of Example I. To the autoclave was added 15.0 g. of carbon monoxide which resulted in a reactor pressure of 2,400 psig. The contents of the autoclave were then stirred at a temperature of 200° C and maintained at this temperature for 4 hours, during which time the pressure decreased from about 3,500 psig to about 3,200 psig.

At the end of this four hour reaction period, the autoclave and its contents were cooled and the pressure vented. The contents were discharged and weighed and the autoclave was rinsed with dichlorobenzene. Insoluble matter present (catalyst plus solids formed during the reaction) was filtered from the reaction mixture and washed with dichlorobenzene. The wash solution was combined with the filtrate and the resulting solution was analyzed by gas-liquid chromotography techniques for 2,4-dinitrotoluene, 2,4-toluene diisocyanate (TDI) and the two toluene monoisocyanato (TMI) isomers (2-isocyanato-4-nitrotoluene and 4-isocyanato-2-nitrotoluene).

The analysis revealed that 80 percent of the 2,4-dinitrotoluene was converted into products and that the selectivity to TDI was 21 percent. Selectivity is defined as the ratio of moles of desired product formed to moles of reactant converted, expressed as a percentage. The total selectivity (selectivity to all isocyanate products, e.g., monoisocyanato nitrotoluenes and toluene diisocyanate) was 85 percent.

Also tested as a co-catalyst under the same conditions was another iron molybdate, ferric molybdate. And for comparative purposes tests were run wherein discrete particles of iron oxide and molybdenum trioxide and mixtures thereof were used as co-catalysts. The procedures used were as described above and the results are shown in Table II.

TABLE II

| Catalyst System | Conversion weight % | Selectivity, % | | |
|---|---|---|---|---|
| | | TDI | TMI | Total |
| $PdCl_2$, 2 mmoles | inactive | | | |
| $PdCl_2$, 2 mmoles; $Fe_2O_3$ — 0.35g. | 25 | trace | 41 | 41 |
| $PdCl_2$, 2 mmoles; $MoO_3$ — 0.3g. | 57 | 9 | 55 | 64 |
| $PdCl_2$, 2 mmoles; $Fe_2O_3$ — 0.05g; $MoO_3$—0.25g. | 50 | 4 | 64 | 68 |
| $PdCl_2$, 2 mmoles, $Fe_2Mo_7O_{24}$ — 0.3g. | 80 | 21 | 64 | 85 |
| $PdCl_2$, 2 mmoles, $Fe_2(MoO_4)_3$— 0.3g. | 80 | 19 | 63 | 82 |

The aforementioned data demonstrate the advantage of utilizing a molybdate as co-catalyst. The iron molybdates exhibit improved activity for the conversion of the aromatic nitro compound and a higher selectivity to the polyisocyanate product.

EXAMPLE III

As discussed herein, it has been reported that the addition of a heteroaromatic nitrogen compound such as pyridine or isoquinoline to a noble metal halide-containing catalyst enhances the activity of the catalyst for the conversion of aromatic nitro compounds to isocyanate products. Tests were conducted according to the procedure of Example II wherein each of the catalyst systems in Table II was employed in the additional presence of pyridine. The data are shown in Table III.

TABLE III

| Catalyst System | Conversion wt. % | Selectivity, % | | |
|---|---|---|---|---|
| | | TDI | TMI | Total |
| $PdCl_2$ — 2 mmoles; pyridine — 3.6 mmoles | 60 | 12 | 78 | 90 |
| $PdCl_2$ — 2 mmoles; pyridine — 3.6 mmoles; $Fe_2O_3$ — 0.35g. | 88 | 22 | 72 | 94 |
| $PdCl_2$ — 2 mmoles; pyridine — 3.6 mmoles; $MoO_3$ — 0.3g. | 83 | 21 | 70 | 91 |
| $PdCl_2$ — 2 mmoles; pyridine — 3.6 mmoles; $MoO_3$ — 0.25.; $Fe_2O_3$ — 0.05g. | 98 | 34 | 44 | 78 |
| $PdCl_2$ — 2 mmoles; pyridine — 3.6 mmoles; $Fe_2Mo_7O_{24}$ — 0.3g. | 100 | 70–76 | 18–12 | 88 |
| $PdCl_2$ — 2 mmoles, pyridine — 3.6 mmoles; $Fe_2(MoO_4)_3$ 0.3g. | 100 | 73 | 10 | 83 |

The selectivity to TDI using a palladium dichloride-pyridine complex as a catalyst is low, and is only slightly improved by the addition of iron oxide or molybdenum oxide or mixtures thereof. However, the addition of an iron molybdate to the palladium dichloride-pyridine catalyst system results in a marked increase in selectivity to TDI. The ratio of TDI to TMI in the resultant product is from about 4:1 to about 6:1 whereas with a catalyst system containing a mixture of the metal oxides the TDI/TMI ratio is less than 1:1.

The relative activity of the molybdate-containing catalyst to that containing a mixture of the metal oxides becomes even more pronounced when the amounts of catalyst used are reduced. Tests were run using only one-half as much catalyst as used in the tests reported in Table III and this data is presented in Table IV.

TABLE IV

| Catalyst System | Conversion wt % | Relative Activity to TDI | Selectivity, % | | |
|---|---|---|---|---|---|
| | | | TDI | TMI | Total |
| $PdCl_2$ — 1 mmole; Pyridine — 1.8 mmole; $Fe_2Mo_7O_{24}$ — 0.15g | 92–94 | 5.7 | 38–42 | 56–52 | 94 |
| $PdCl_2$ — 1 mmole; Pyridine — 1.8 mmole; $MoO_3$— 0.12g; $Fe_2O_3$ — 0.03g | 65 | 1 | 10 | 84 | 94 |
| $PdCl_2$ — 1 mmole; Pyridine — 1.8 mmole; $Fe_2(MoO_4)_3$ — 0.15g | 92 | 5.8 | 41 | 50 | 91 |
| $PdCl_2$ — 1 mmole; Pyridine — 1.8 mmole; $MoO_3$— 0.10g; $Fe_2O_3$ — 0.05g | 63 | 0.9 | 9 | 81 | 90 |

In computing the relative activity of the molybdate-containing catalyst systems, the yield of TDI for the mixed oxide catalyst system with a molybdenum/iron ratio corresponding to the ferric heptamolybdate was taken as unity. The relative activity of the other catalysts is therefore the ratio of its yield to that of the mixed oxide catalyst. The data show the molybdate-containing catalysts to be almost six times more active for the production of TDI.

EXAMPLE IV

Tests were run according to the procedure of Example II except that the catalyst system consisted of 2 moles of palladium dichloride, 3.6 mmoles of pyridine and approximately 0.3g of various manganese polymolybdates, some of which are listed in Table I. The results are presented in Table V.

TABLE V

| Mo/Mn ratio of Mn polymolybdate | Mn Source | Conversion Wt. % | Selectivity, % | | |
|---|---|---|---|---|---|
| | | | TDI | TMI | Total |
| 1:1 ($MnMoO_4$) | $Mn^{II}$ | 98.5 | 50 | 34 | 84 |
| 9:1 | $Mn^{II}$ | 98.0 | 61 | 22 | 83 |
| 20:1 | $Mn^{II}$ | 100 | 73 | 12 | 85 |
| 45:1 | $Mn^{II}$ | 97.5 | 43 | 43 | 86 |
| 80:1 | $Mn^{II}$ | 80.0 | 16.5 | 64.5 | 81 |
| 3:1 | $Mn^{IV}$ | 98.5 | 50 | 41 | 91 |
| 12:1 | $Mn^{IV}$ | 99.5 | 54 | 32 | 86 |
| 20:1 | $Mn^{IV}$ | 100 | 56 | 17 | 73 |
| 60:1 | $Mn^{IV}$ | 82.5 | 15.5 | 56 | 71.5 |

EXAMPLE V

The procedure of Example II was repeated except that the catalyst system consisted of 2 mmoles $PdCl_2$, 3.8 mmoles isoquinoline and 0.3 grams $Fe_2Mo_7O_{24}$. The conversion of the 2,4-dinitrotoluene was quantitative and the selectivity to 2,4 toluene-diisocyanate was 78.5 percent. The total selectivity to isocyanate products was 83.5 percent.

EXAMPLE VI

The procedure of Example V was repeated except that 3.8 mmoles of quinoline was used instead of the isoquinoline. The conversion of the 2,4-dinitrotoluene was 95.0 percent and the selectivity to 2,4-toluene-diisocyanate was 46 percent. The total selectivity to isocyanate products was 80 percent.

EXAMPLE VII

The procedure of Example V is repeated except that 3-chloropyridine is used instead of isoquinoline. A good yield of 2,4-toluene diisocyanate is obtained.

EXAMPLE VIII

The procedure of Example II is repeated except that the organic nitro compound is bis(4-nitrophenyl)methane and the catalyst system consists of 2 mmoles $PdCl_2$, 3.8 mmoles pyridine and 0.3 gram ferric heptamolybdate. Methylene bis(4-phenylisocyanate) is produced in good yield.

EXAMPLE IX

The procedure of Example VII is repeated except that the organic nitro compound is 1,3,5-trinitronaphthalene. A good yield of 1,3,5-naphthalene triisocyanate is obtained.

EXAMPLE X

The procedure of Example II was repeated except that the catalyst system consisted of 1.2 mmoles of a palladium dibromideepyridine complex ([$C_5H_5N$]$_4$PdBr$_2$) and 0.3 grams of $Fe_2Mo_7O_{24}$. The conversion of 2,4-dinitrotoluene was 82 percent and the selectivity to 2,4-toluene diisocyanate was 30 percent. The total selectivity to isocyanate products was 94 percent.

EXAMPLE XI

The procedure of Example II was repeated except that the catalyst system consisted of 2 mmoles of rhodium trichloride and 0.3 grams of $Fe_2Mo_7O_{24}$ and the total reaction time was 5 hours. The conversion of 2,4-dinitrotoluene to products was 82 percent and the selectivity to 2,4-toluene diisocyanate was 26 percent. The total selectivity to isocyanate products was 86 percent.

EXAMPLE XII

The procedure of Example II is repeated except that the organic nitro compound is a mixture of 2-isocyanato-4-nitrotoluene, 4-isocyanato-2-nitrotoluene and 2,4-dinitrotoluene. A good yield of 2,4-toluene diisocyanate is obtained.

EXAMPLE XIII

The procedure of Example II is repeated except that the organic nitro compound is 1-propyl-2,4-dinitrobenzene. A good yield of 1-propyl-2,4-diisocyanatobenzene is obtained.

EXAMPLE XIV

The procedure of Example II is repeated except that the organic polynitro compound is 1-chloro-2,4-dinitronaphthalene. A good yield of 1-chloro-2,4-naphthalene diisocyanate is obtained.

EXAMPLE XV

The procedure of Example II is repeated except that the organic polynitro compound is 2,7-dinitrophenanthrene. A good yield of 2,7-phrenathrene diisocyanate is obtained.

EXAMPLE XVI

The procedure of Example V is repeated using 1-methylpyrrole in place of the isoquinoline. A good yield of 2,4-toluene diisocyanate is obtained.

EXAMPLE XVII

The procedure of Example V is repeated using acridine in place of the isoquinoline. A good yield of 2,4-toluene diisocyanate is obtained.

EXAMPLE XVIII

The procedure of Example V is repeated using pyrazine in place of isoquinoline. A good yield of 2,4-toluene diisocyanate is obtained.

We claim as our invention:

1. In the process for preparing carbocyclic aromatic polyisocyanates by contacting carbocyclic polynitro compounds having from six to 30 carbon atoms and from two to four nitro groups, each of said nitro groups being attached to an aromatic carbon atom, with carbon monoxide at a temperature of from about 100° C to about 300° C and at a carbon monoxide pressure of from about 500 psig to about 5,000 psig in the presence of a catalyst system consisting essentially of a noble metal halide, a heteroaromatic nitrogen compound and a combination of iron or manganese oxide and molybdenum oxide, the improvement which comprises providing said combination of iron or manganese oxide and molybdenum oxide as an iron or manganese molybdate, said molybdate containing only molybdenum and oxygen in addition to said iron or manganese, and in an amount such that the atomic ratio of molybdenum to noble metal in the catalyst system is from about 1:4 to about 4:1.

2. The process of claim 1 wherein the noble metal halide is palladium dichloride, rhodium trichloride, palladium dibromide, rhodium tribromide, palladium diiodide or rhodium triiodide.

3. The process of claim 2 wherein the heteroaromatic nitrogen compound is selected from the group consisting of heteroaromatic nitrogen compounds having a ring containing
   a. five or six members,
   b. only nitrogen and carbon,
   c. no more than two nitrogen atoms, and
   d. at least two double bonds.

4. The process of claim 3 wherein the heteroaromatic nitrogen compound is pyridine or isoquinoline.

5. The process of claim 4 wherein the metal molybdate is an iron molybdate with the molybdenum/iron ratio of from 1:1 to 5:1.

6. The process of claim 5 wherein the iron molybdate is ferric heptamolybdate.

7. The process of claim 5 wherein the iron molybdate is ferric molybdate.

8. The process of claim 4 wherein the metal molybdate is a manganese molybdate with a molybdenum/manganese ratio of from 1:1 to 45:1.

9. The process of claim 8 wherein the manganese molybdate is manganous molybdate.

10. The process of claim 8 wherein the manganese molybdate has a molybdenum/manganese ratio of approximately 20:1 represented by an empirical formula $MnMo_{20}O_{61}$.

11. The process of claim 1 wherein the aromatic polynitro compound has at least two nitro groups and is represented by the formula

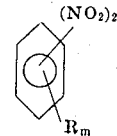

wherein $m$ is a whole number from 0 to 3 inclusive and R independently is nitro, alkyl, cycloalkyl, aralkyl, aryl or alkaryl of up to 10 carbon atoms, chlorine, bromine, alkoxy of up to six carbon atoms, aryloxy or alkaryloxy of up to 10 carbon atoms, aralkoxy of up to 10 carbon atoms, alkylthio of up to six carbon atoms or arylthio of up to 10 carbon atoms.

12. The process of claim 11 wherein the R groups of the aromatic polynitro compound are selected from chlorine, bromine, alkyl, cycloalkyl, aralkyl, aryl and alkaryl.

13. The process of claim 12 wherein the aromatic polynitro compound is dinitrotoluene.

14. The process of claim 1 wherein the aromatic polynitro compound is bis(4-nitrophenyl)methane.

* * * * *